United States Patent
Sun et al.

(10) Patent No.: US 9,402,238 B1
(45) Date of Patent: Jul. 26, 2016

(54) METHOD AND APPARATUS FOR CONTROLLING A TRANSMIT POWER LEVEL OF A DEVICE IN A WIRELESS COMMUNICATIONS NETWORK

(71) Applicant: Marvell International Ltd., Hamilton (BM)

(72) Inventors: Yakun Sun, Sunnyvale, CA (US); Liwen Chu, San Ramon, CA (US); Hongyuan Zhang, Fremont, CA (US); Hui-Ling Lou, Sunnyvale, CA (US); Lei Wang, San Diego, CA (US); Jinjing Jiang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/660,724

(22) Filed: Mar. 17, 2015

Related U.S. Application Data

(60) Provisional application No. 61/954,439, filed on Mar. 17, 2014.

(51) Int. Cl.
| | |
|---|---|
| *H04B 7/00* | (2006.01) |
| *H04W 52/24* | (2009.01) |
| *H04W 52/02* | (2009.01) |
| *H04W 88/08* | (2009.01) |

(52) U.S. Cl.
CPC ........ *H04W 52/243* (2013.01); *H04W 52/0206* (2013.01); *H04W 88/08* (2013.01)

(58) Field of Classification Search
CPC .... H04B 15/00; H04W 52/04; H04W 52/243; H04W 52/24; H04W 52/50; H04W 52/40; A01B 12/006
USPC .............................. 455/13.4, 522, 127.1, 63.1
See application file for complete search history.

(56) References Cited

U.S. PATENT DOCUMENTS

| | | | | |
|---|---|---|---|---|
| 6,351,651 | B1* | 2/2002 | Hamabe ............. | H04W 52/343 455/522 |
| 8,913,582 | B1* | 12/2014 | Zhang ................. | H04B 7/0619 370/235 |
| 2008/0119216 | A1* | 5/2008 | Lee ........................ | H04W 52/24 455/522 |
| 2009/0143016 | A1* | 6/2009 | Li ......................... | H04W 52/40 455/63.1 |
| 2010/0087221 | A1* | 4/2010 | Srinivasan ............ | H04W 16/08 455/522 |
| 2012/0163305 | A1* | 6/2012 | Nimbalker ........ | H04W 52/0206 370/329 |
| 2012/0178482 | A1* | 7/2012 | Seo ....................... | H04W 56/00 455/501 |
| 2013/0017859 | A1* | 1/2013 | Yamamoto .......... | H04J 11/0056 455/522 |
| 2013/0143614 | A1* | 6/2013 | Lee ...................... | H04W 52/146 455/509 |
| 2013/0265992 | A1* | 10/2013 | Deng ................... | H04W 56/001 370/336 |
| 2013/0329592 | A1* | 12/2013 | Beale .................. | H04W 72/082 370/252 |

(Continued)

*Primary Examiner* — MD Talukder

(57) ABSTRACT

A wireless communication system includes a first wireless access point, and a first set of at least one first station in wireless communication with the first wireless access point. The first wireless access point controls power for communications with a first station in the set of at least one first station. The first wireless access point may control power in a time-domain, announcing a power level for use during a time window. The first wireless access point may control power levels in a frequency-domain, announcing different power levels for different frequency subchannels within a frequency channel. The wireless communication system may further include an additional wireless access point, and an additional set of at least one additional station in wireless communication with the additional wireless access point. The first and additional wireless access points control power to avoid interference between the first and additional wireless access points.

24 Claims, 10 Drawing Sheets

(56) References Cited

U.S. PATENT DOCUMENTS

| | | | | |
|---|---|---|---|---|
| 2014/0141832 A1* | 5/2014 | Liang | ................ | H04W 52/146 455/522 |
| 2015/0017993 A1* | 1/2015 | Ishii | ................ | H04W 36/0011 455/444 |
| 2015/0237655 A1* | 8/2015 | Lu | ................ | H04W 74/0833 370/329 |

* cited by examiner

METHOD AND APPARATUS FOR CONTROLLING A TRANSMIT POWER LEVEL OF A DEVICE IN A WIRELESS COMMUNICATIONS NETWORK

CROSS REFERENCE TO RELATED APPLICATION

This claims the benefit of commonly-assigned U.S. Provisional Patent Application No. 61/954,439, filed Mar. 17, 2014, which is hereby incorporated by reference herein in its entirety.

FIELD OF USE

This disclosure relates to controlling access point power levels in a wireless communications network.

BACKGROUND

A wireless communications network may include a plurality of devices—e.g., access points (APs), with each respective access point serving a respective plurality of stations (STAs). For example, in a wireless local area network (WLAN) under the IEEE802.11 standard (commonly referred to as "Wireless Fidelity" or "WiFi"), a grouping including one access point and its associated stations may be referred to as a "basic service set" (BSS). Such a network may include multiple BSSs.

Each access point can set its own transmit power level, up to any regulatory maximum that may be imposed (these may differ by jurisdiction). The access point also can control the transmit power levels of its associated stations through control messages (e.g., "Beacon" or "Probe" messages under the IEEE802.11 standard).

However, in practice, access points and associated stations usually operate at the maximum permitted power level at all times, even on links involving close physical proximity with good signal characteristics. From the perspective of the access point, the access point "wants" all potentially associated stations to be able to communicate with the access point. From the perspective of an associated station, operating at a lower power level may result in the station losing its channel to another station (a "hidden node") that had been quiescent but suddenly becomes active, on the same channel, at a higher power level. To avoid that result, the station may operate at a high power level, even if not required under current conditions to reach the access point, to make sure that any hidden node is aware that the channel is in use.

Such power behavior by both access points and associated stations may lead to performance degradation, particularly in a network with multiple access points, some of which may have overlapping coverage areas ("overlapping BSSs" or "OBSSs"). First, there is the basic inefficiency of using more power than needed to accomplish a particular communication. Second, in an OBSS configuration, two access points with overlapping coverage areas may interfere with each other, in that stations within the overlap area may be unable to maintain a consistent link with one access point if the signal from another nearby access point is too strong. Third, the ability to perform Dynamic Clear Channel Assessment ("Dynamic CCA") may be impaired as well.

SUMMARY

A wireless communication system includes a first wireless access point, and a first set of at least one first station in wireless communication with the first wireless access point. The first wireless access point controls power for communications with a first station in the set of at least one first station.

The first wireless access point may control power in a time-domain, announcing a power level for use during a time window.

The first wireless access point may control power levels in a frequency-domain, announcing different power levels for different frequency subchannels within a frequency channel.

The wireless communication may further include an additional wireless access point, and an additional set of at least one additional station in wireless communication with the additional wireless access point, where the additional wireless access point controls power for communications with an additional station in the additional set of at least one additional station. The first wireless access point and the additional wireless access point control power to avoid interference between the first wireless access point and the additional wireless access point.

A method of operating a wireless communication system having a first wireless access point, and a first set of at least one first station in wireless communication with the first wireless access point, includes controlling power at the first wireless access point for communications with a first station in the set of at least one first station.

Controlling power may include controlling power at the first wireless access point in a time-domain, including the first wireless access point announcing a power level for use during a time window.

Controlling power may include controlling power at the first wireless access point in a frequency-domain, including the first wireless access point announcing different power levels for different frequency subchannels within a frequency channel.

Where the wireless communication system includes an additional wireless access point, and an additional set of at least one additional station in wireless communication with the additional wireless access point; the method also may including coordinating between the first wireless access point and the additional wireless access point so that the first wireless access point and the additional wireless access point set power levels to avoid interference between the first wireless access point and the additional wireless access point.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Various implementations of this disclosure provide more selective power control between an access point and its associated stations to mitigate the performance degradation described above. Power control also may be coordinated between multiple access points, and particularly between access points located near each other in OBSS configurations.

Figure 1:
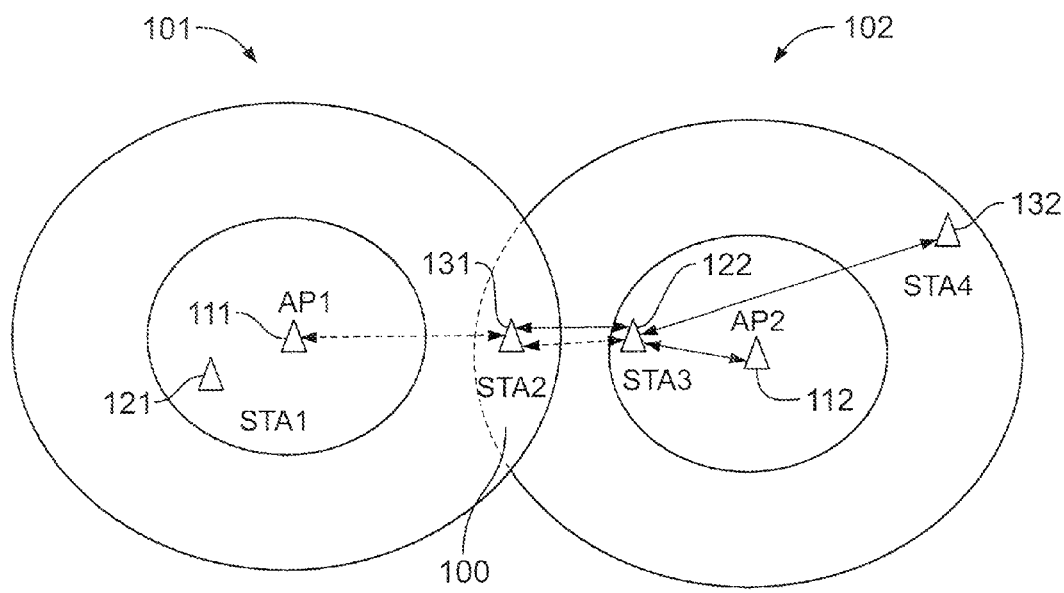
FIG. 1 illustrates a scenario that can be improved using implementations of this disclosure.

FIG. 1 illustrates a scenario that can be improved using implementations of this disclosure. In this scenario, BSS 101, served by access point AP1 (111), overlaps with BSS 102, served by access point AP2 (112). BSS 101 also includes stations STA1 (121) and STA2 (131), while BSS 102 also includes stations STA3 (122) and STA4 (132); station STA2 (131) is in the overlap area 100.

Because STA2 (131) is on the edge of BSS 101, STA2 (131) uses the maximum power level to communicate with AP1 (111). Although STA3 (122) is in the central portion of BSS 102, STA3 (122) nevertheless also uses the maximum power level to communicate with AP2 (112) because it wants to also reach any hidden nodes, such as STA4 (132), to avoid the "hidden node" problem discussed above. Because STA2 (131) and STA3 (122) are relatively close to one another and both are using maximum power, STA2 (131) and STA3 (122) may interfere with each other's transmissions. The interference may affect both uplinks (communications from a station to an access point) and downlinks (communications from an access point to a station).

In accordance with this disclosure, an access point in a BSS can set power levels, either for a specific station or stations within the BSS, or for a group or groups of stations within the BSS. The power control can be separate for uplinks and downlinks.

According to one implementation, an access point can impose station-specific power control for uplinks. For example, the access point can measure the received power on the uplink from a particular station and calculate a power constraint for that station, so that the power level is sufficient for good reception, but not so high as to interfere unnecessarily with other stations (or access points). This may occur upon receiving an association/reassociation/probe request or an acknowledgment, and can be periodically re-evaluated upon receiving subsequent frames from that station.

In accordance with such an implementation, an access point can set a local maximum transmit power for each station. The local maximum transmit power can be set to an absolute value or a relative value. For example, an absolute value can be expressed as a dB value based on 1 mW, while a relative value can be expressed as a dB value offset from a BSS-specific power constraint or other reference value. While not all stations may be equipped for station-specific power control (e.g., some older station equipment may not be upgraded for this feature), a station that is capable of station-specific power control will overwrite or ignore any BSS-specific local maximum transmit power indication that it may receive from a beacon or probe response.

In one variant, the maximum transmit power may be communicated to the station via a modified Transmit Power Control (TPC) report in which the Link Margin is replaced with a transmit power constraint. If necessary, the station can autonomously impose a power constraint on itself by sending a TPC request.

According to another implementation, an access point can impose group-specific power control for uplinks. For example, the access point can announce multiple levels of local maximum transmit power, with each different level applying to all stations within different groups of stations within the BSS. The multiple local maximum transmit power levels can be broadcast via a beacon or probe request in place of a single local maximum transmit power level. Alternatively, the multiple local maximum transmit power levels may be broadcast via other management or control frames provided for this purpose. Or both techniques can be used—for example, an initial set of local maximum transmit power levels can be broadcast by beacon or probe request, while subsequent changes can be broadcast in management or control frames. As in the case of the station-specific power levels, the multiple local maximum transmit power levels can be characterized as absolute values or relative values.

According to one variant, the access point can assign particular stations to particular groups (each group having a specified local maximum transmit power level) either explicitly or implicitly. Under explicit grouping, the access point can signal each station to specify which group the station belongs to. This signaling can occur as part of association or reassociation, or a management or control frame can be provided for this purpose. Or both techniques can be used—for example, an initial grouping assignment can be set on association or reassociation, while subsequent changes can be broadcast in management or control frames. Under implicit grouping, the access point would announce the various power levels and each respective station would decide autonomously which group the respective station wants to join (e.g., based on its power needs). As above, a station assigned to, or choosing to join, a particular power group will overwrite or ignore any BSS-specific local maximum transmit power level indication that the station may receive from a beacon or probe response.

According to another implementation, downlink power can be controlled. In the downlink case, the access point is transmitting, and can never exceed the maximum transmit power set by regulations in the jurisdiction in which the access point operates. However, different levels up to that regulatory maximum may be used to transmit to different stations or groups of stations. As in the uplink case, the access point can set a specific maximum transmit power level that the access point will use to communicate with each station, or the access point can set multiple levels and assign groups of stations to each power level or invite each station to join a power level group (which the particular station would then announce to the access point).

For all of the foregoing implementations—whether for uplinks or downlinks, and whether station-specific or by group—power (transmit power level) can be controlled either in the time domain or in the frequency domain.

In a time-division implementation, there are several variants. In all variants, the access point sets different temporal windows, each of which has its own associated maximum power level. The windows can be announced to associated stations in the access point's BSS using an existing mechanism such as wireless raw injection (RAW) or Hybrid Coordination Function Controlled Channel Access (HCF Controlled Channel Access or HCCA), or using a new control or management frame.

According to one variant of a time-division power control implementation, the access point announces a window with a set maximum power level. Any individual station can determine on its own whether to use the window, based on its own power needs. It will be apparent that a low maximum power level will exclude from the window those stations that require a high power level, but a high maximum power level may allow all stations with power needs up to that power level to use the window.

Therefore, according to another variant of a time-division power control implementation, the access point announces a window with explicit power grouping. That is, stations will have been assigned ahead of time, in a manner similar to that discussed above, to a particular power group. When the access point announces the window, the access point announces which power group can use the window, and only stations assigned to that group attempt to access the channel.

According to a third variant of a time-division power control implementation, the access point announces a window with implicit power grouping. In this variant, stations will not have been assigned ahead of time to a particular power group. When the access point announces the window, the access point announces a maximum power level, and stations that require that power level decide on their own whether to attempt to access the channel. Although this third variant is similar to the first variant, the grouped nature of this variant may help prevent low-power stations from crowding out high-power stations in high-power windows—even though there may be more than sufficient power for a low-power station, because the station knows it is operating in a grouped power mode, the station will refrain from attempting to access a channel that has been announced as a high-power group channel.

It may be possible to combine some of these variants of a time-division power control implementation. For example, the access point may explicitly announce a power window for a particular group of stations, but may also invite specific stations outside that group to use that window as well. Other combinations may be possible.

In addition, in a time-division power control implementation, the access point could set a power limit to zero or to a very low limit close to zero. Such a "mute" window could be imposed, for example, to reduce interference in a neighboring BSS (this assumes some form of communication between the access points, or between each access point and a central controller (not shown), which would advise the first wireless access point that the BSS of the neighboring access point was doing something that required the first BSS to quiet down).

The variants of a time-division power control implementation as described thus far have focused on the uplink direction, but a time-division power control window can be used for uplinking, downlinking or both. If the window is used for downlinking (either exclusively or in combination with uplinking), the access point can announce its own maximum transmit power level when the access point announces the window. The associated stations in the BSS can compare that announced access point maximum transmit power level to its own reception needs and act accordingly. According to one option, if the announced access point transmit power level is below what the station needs, the station can enter another mode in which the station does not listen (see below). According to another option, if stations are grouped by power requirements, a station can decide based on the announced access point transmit power level whether the station is a potential intended recipient of messages in this window. Similarly, if a window is intended to be used by stations with good signal characteristics and low power requirements, the Clear Channel Assessment (CCA) level can be set to a less sensitive level.

If the announced access point transmit power level for a window is such that a particular station will not be using that window, the station can enter a different mode. For example, the station could set a Network Allocation Vector or timer for either the duration of the window, or for some shorter duration, during which the station will not attempt to access the channel, and after which the station can examine the channel to see if anything has changed. Alternatively, the station can go to sleep completely for that duration. Finally, the station can attempt to use a different channel or access a different access point (if the station is in an OBSS situation).

Figure 2:
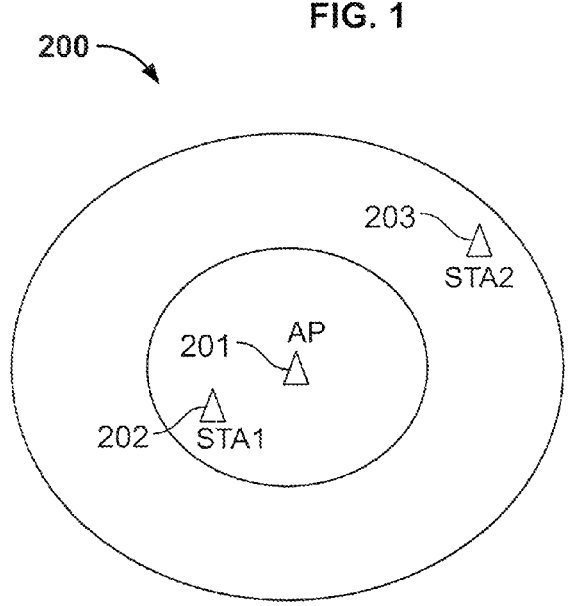
FIG. 2 shows an exemplary BSS.
Figure 3:
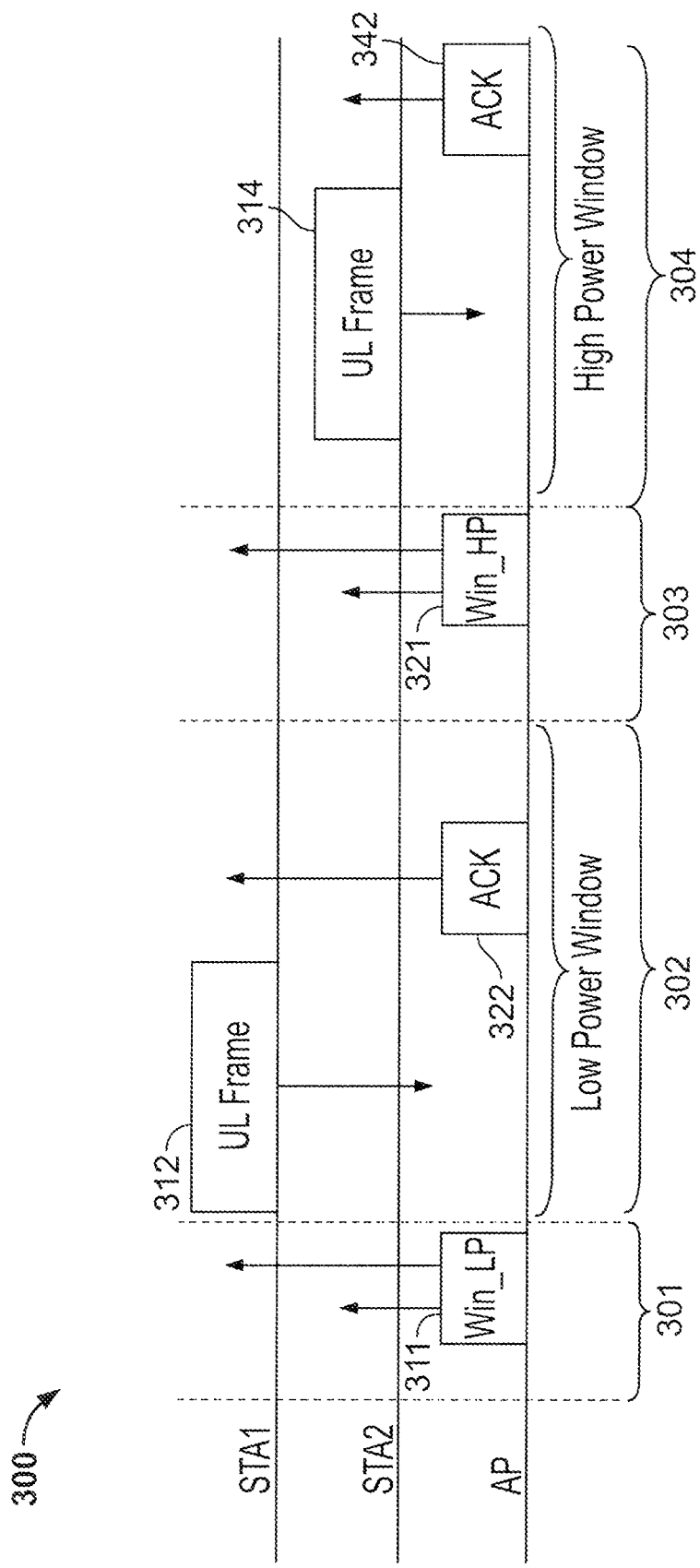
FIG. 3 shows an example of signaling within the BSS of FIG. 2 using an implementation of this disclosure.

FIG. 2 shows an exemplary BSS 200, while FIG. 3 shows an example 300 of signaling within that BSS 200 using time-domain power control. In BSS 200, access point 201 serves a first station STA1 (202) that is relatively close to access point 201, and second station STA2 (203) that is relatively far from access point 201, near the edge of BSS 200. Thus, station STA2 (203) can communicate reliably only at high power, while station STA1 (202) can communicate reliably at high or low power, but should use low power for efficiency, to prevent interference, etc.

As shown in FIG. 3, access point 201 announces during control/management frame 301 that the local maximum transmit power is now low. This announcement 311 is sent at high power so that all stations in BSS 200 receive the announcement 311. During the ensuing low-power window 302, STA1 (202) sends uplink frame(s) 312 at low power to access point 201, which returns acknowledgment(s) 322 at low power. STA1 (202) can use low power without worrying about the "hidden node" problem relative to STA2 (203), because STA2 (203) has received the low-power signal and will remain quiet. Because STA1 (202) does not have to use high power merely to avoid the hidden node problem, STA1 (202) creates less interference (e.g., to neighboring BSSs).

After low-power window 302, access point 201 announces during control/management frame 303 that the local maximum transmit power is now high. Again, this announcement 312 is sent at high power so that all stations in BSS 200 receive the announcement 312. During the ensuing high-power window 304, STA2 (203) sends uplink frames 314 at high power to access point 201, which returns acknowledgment(s) 342 at low power. This protects the reliability of the transmission for edge stations, but, unless BSS 200 is operating in an explicit-grouping mode as discussed above, there is nothing preventing STA1 (202) from also communicating during window 304. If STA1 (202) does communicate during window 304, STA1 (202) preferably does so at the lowest power level necessary to be heard among the high-power stations that are also communicating, but STA1 (202) could use any power level up to the set maximum power level.

Control/management frames 301, 303 to announce the power level can be of any kind of existing control/management frame, (e.g., a beacon or probe frame), or a new control/management frame explicitly for that purpose.

A particular BSS is usually part of a larger network including other BSSs served by other access points. Each access point may plan its power windows based on constraints and needs within its own BSS as well as neighboring BSSs. As noted above, each access point typically reserves high power for use in communicating with "edge" stations (those that have poor signal characteristics whether or not they are physical remote from the access point). The access points can try to coordinate so that when one access point sets a high-power window, the neighbors of the access point set low-power windows.

One example is the scenario illustrated in FIG. 1 above. As noted above, BSS 101, served by access point AP1 (111), overlaps with BSS 102, served by access point AP2 (112). BSS 101 also includes stations STA1 (121) and STA2 (131), while BSS 102 also includes stations STA3 (122) and STA4 (132); station STA2 (131) is in the overlap area 100. Because station STA2 (131) is on the edge of BSS 101, station STA2 (131) uses the maximum power level to communicate with AP1 (111). Although station STA3 (122) is in the central portion of BSS 102, station STA3 (122) nevertheless also uses the maximum power level to communicate with AP2 (112) because station STA3 (122) wants to also reach any hidden nodes, such as station STA4 (132), to avoid the "hidden node" problem discussed above. Because stations STA2 (131) and STA3 (122) are relatively close to one another and both are using maximum power, they may interfere with each other's transmissions. The interference may affect both uplinks (communications from a station to an access point) and downlinks (communications from an access point to a station).

Figure 4:
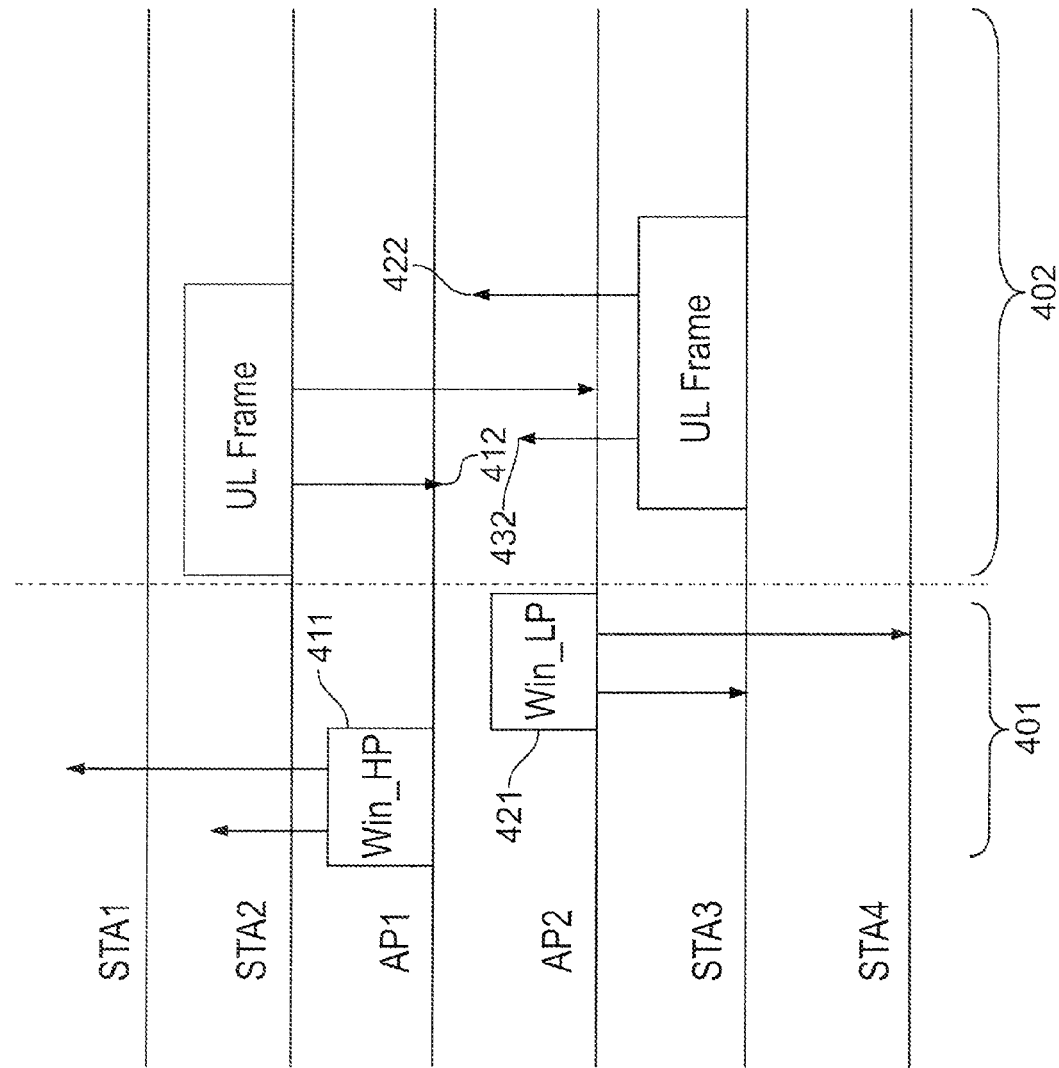
FIG. 4 is a diagram showing signaling within an OBSS arrangement similar to FIG. 1 during an uplink, using a time-division power control implementation of this disclosure.

As seen in FIG. 4, in control frame 401, access point AP1 (111) of BSS 101 announces a high-power window at 411 while access point AP2 (112) of BSS 102 announces a low-power window at 421. During the ensuing window 402, station STA2 (131) uplinks to access point AP1 (111) at high power while nearby station STA3 (122) uplinks to access point AP2 (112) at low lower. Station STA2 (131) in its high-power window, and having a strict CCA threshold, will reliably access a channel to access point AP1 (111) and reliably transmit (see 412), even though station STA3 (122) is transmitting nearby, because station STA3 (122) is transmitting at a lower power and does not reach access point AP1 (111) (see 422). Station STA3 (122) in its lower-power window, and having a relaxed CCA threshold, will reliably access a channel to access point AP2 (112) and reliably transmit even when station STA2 (121) is transmitting (see 432), because station STA3 (122) is close to AP2.

Figure 5:
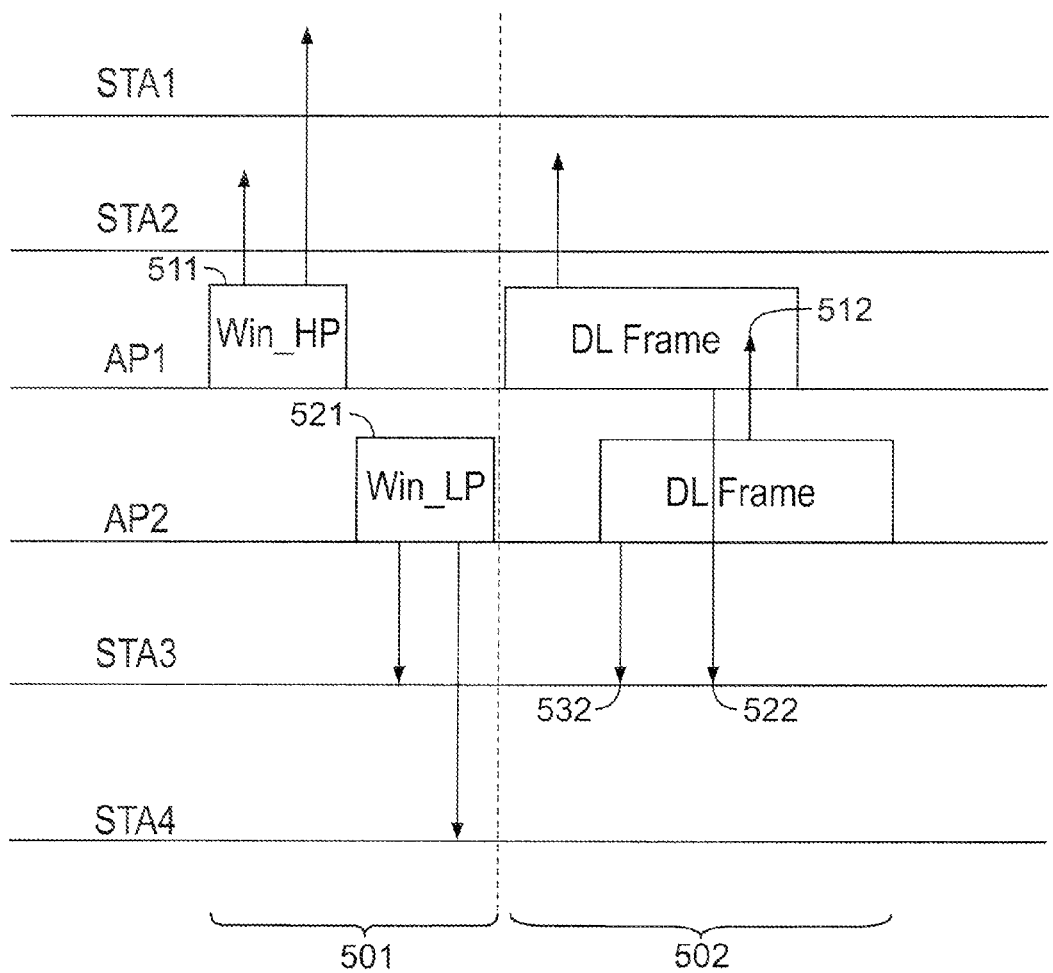
FIG. 5 is a diagram showing signaling within the BSS of FIG. 1 during a downlink, using a time-division power control implementation of this disclosure.

Similarly in FIG. 5, in the downlink case, in control frame 501, access point AP1 (111) of BSS 101 announces a high-power window at 511 while access point AP2 (112) of BSS 102 announces a low-power window at 521. During the ensuing window 502, access point AP1 (111) downlinks to station STA2 (131) at high power while access point AP2 (112) downlinks to nearby station STA3 (122) at low lower. STA2 (131) in its high-power window, and having a strict CCA threshold, will reliably access a channel to access point AP1 (111) and reliably receive, even though access point AP2 (112) is transmitting, because access point AP2 (112) is transmitting at low power and does not reach station STA2 (131) (see 512). Station STA3 (122) in its lower-power window, and having a relaxed CCA threshold, will reliably access a channel to access point AP2 (112) and reliably receive even though access point AP1 (111) is transmitting (see 522), because station STA3 (122) is close to access point AP2 (112) (see 532).

Figure 6:
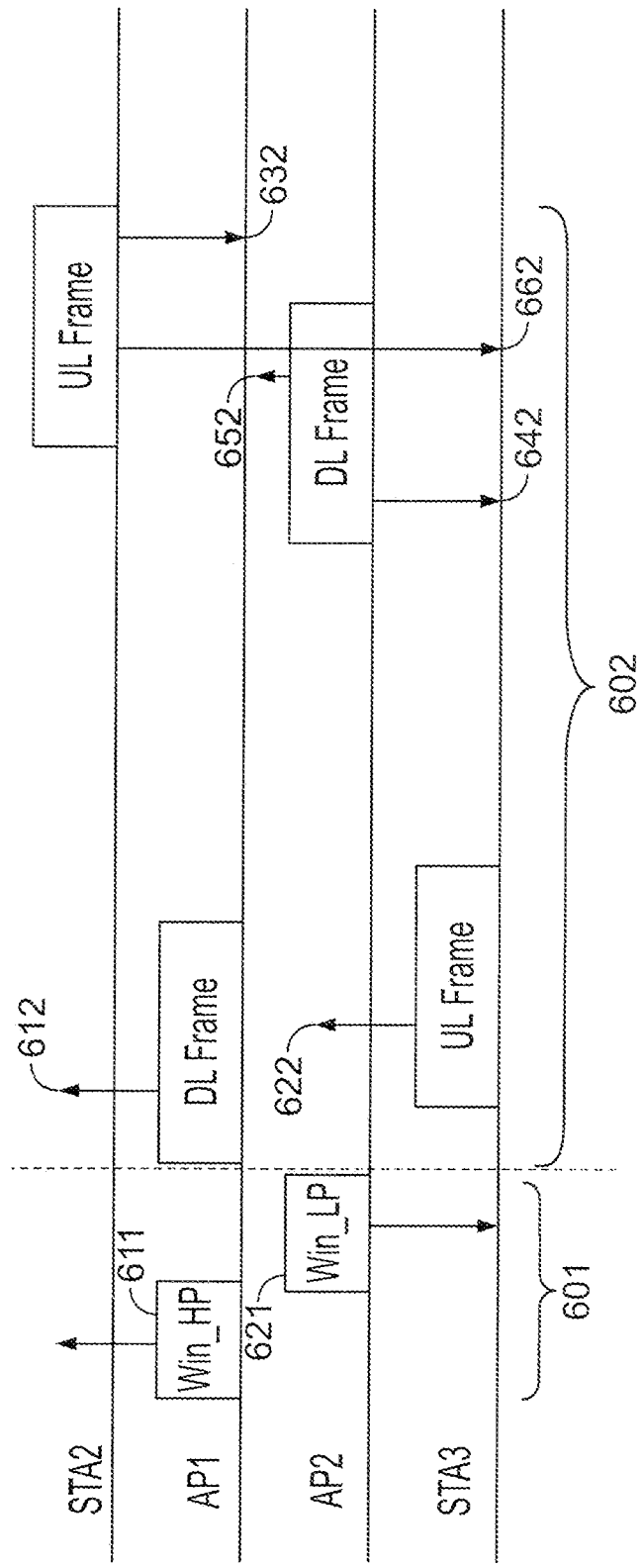
FIG. 6 is a diagram showing signaling within the BSS of FIG. 1 during a mixed uplink/downlink case, using a time-division power control implementation of this disclosure.

FIG. 6 shows a mixed uplink/downlink case. In control frame 601, access point AP1 (111) of BSS 101 announces a high-power window at 611 while access point AP2 (112) of BSS 102 announces a low-power window at 621. During the ensuing window 602, first, access point AP1 (111) downlinks to station STA2 (131) (see 612) at high power while nearby station STA3 (122) uplinks to access point AP2 (112) at low power (see 622). Station STA2 (131) in its high-power window, and having a strict CCA threshold, will reliably access a channel to access point AP1 (111) and reliably receive, even though nearby station STA3 (122) is transmitting, because nearby station STA3 (122) is transmitting at low power and does not reach station STA2 (131) (see 622). Subsequently, station STA2 (131) in its high-power window can uplink to access point AP1 (111) (see 632) even though access point AP2 (112) is transmitting to nearby station STA3 (122) (see 642), because access point AP2 (112) is transmitting at a low power level and does not reach station STA2 (131) (see 652). Access point AP2 (112) in its lower-power window will reliably access a channel to downlink to station STA3 (122) (see 642), having a relaxed CCA threshold, which will reliably receive the downlink even though nearby station STA2 (131) is transmitting (see 662), because station STA3 (122) is close to access point AP2 (112) (see 642).

Coordination among access points may start with each access point that wants to begin transmitting listening to its neighboring access point(s). The later-starting access point can listen to the broadcast power window announcement(s) of other access points and decide its own power pattern accordingly. Such "listening" can be assisted by station reports, where each access point can require stations associated with that access point to report when those stations hear any power window announcements from neighboring access points (most likely it would be spatially remote stations that would hear such announcements by neighboring access points). Alternatively, or additionally, stations can report the received neighboring power window information either periodically, or at association/re-association. Each access point also can regularly poll stations associated with that access point to see if the stations have heard any such announcements. As a further alternative, where the access points are part of a managed network, coordination among access points can be managed via backhaul communications with a management entity.

In FIGS. 4-6 the power window announcements have been shown to occur synchronously. One system for joint transmission by multiple access points, that may be used for synchronous announcements, is described in copending, commonly-assigned U.S. Provisional Patent Application No. 62/054,692, filed Mar. 6, 2014, and U.S. patent application Ser. No. 14/639,477, filed Mar. 5, 2015, each of which is hereby incorporated by reference in its respective entirety. Other timing approaches are possible. In a first "semi-synchronous" approach, each access point can send its power window announcement after the Short Interframe Space following the power window announcement of a neighboring access point. In a second semi-synchronous approach, the power window announcements can be sent at pre-negotiated times. Or the power window announcements can be sent completely asynchronously, without special priority.

As discussed above, power also can controlled in a frequency-division power control implementation. In such an implementation, each access point may operate with a given frequency channel divided into subchannels, and each subchannel may be associated with its own power requirement and CCA sensitivity.

For example, in one variant, an access point may operate in an 80 MHz-wide channel, with that channel divided into subchannels according to one of several possible subchannelization modes. For example, the 80 MHz-wide channel may be divided into four 20 MHz-wide subchannels, or two 40 MHz-wide subchannels, or two 20 MHz-wide subchannels and one 40 MHz-wide subchannel.

The subchannelization and corresponding power and CCA settings can be communicated to the various stations by one of several different communications mechanisms. According to one variant, the subchannelization and the power and CCA settings can be included in the communication of the initial system configuration. According to another variant, the subchannelization and the power and CCA settings can be announced by some existing mechanism, such as Beacon, Probe Response, RAW or HCCA, as mentioned above, or by other mechanism such as enhanced distributed channel access (EDCA), or Physical Layer Convergence Procedure protocol data unit (PLCP protocol data unit or PPDU) SIG fields. According to still another variant, the subchannelization and the power and CCA settings can be announced by new control/management scheme using its own communications frame.

In a frequency-division power control implementation, there also are different variants for assigning particular stations to particular subchannels. According to a first variant, after the power levels for different subchannels are established, they are announced, as discussed above, to the stations. Each station compares its specific power requirements and CCA setting to the announced frequency-division power control settings for various subchannels and identifies a subchannel with which the station is compatible. The station then attempts to access that subchannel according to the established channel access rules. According to a first variant, stations may be assigned to power groups as in the time-division implementation, and an access point will announce which station groups can access which subchannels. The station(s) in each group will then attempts to access the appropriate subchannel(s) according to the established channel access rules.

As in the case of the time-division implementation, some combination of the two aforementioned variants of the frequency-division implementation may be used. And again as in the case of the time-division implementation, the access point could set a power limit for a certain subchannel to zero or to a very low limit close to zero. Such a "mute" subchannel could be imposed, for example, to reduce interference in a neighboring BSS.

Any particular subchannel may be used for uplinking only, downlinking only, or both uplinking and downlinking. As to any subchannel that is used for downlinking (whether or not the subchannel also is used for uplinking), the access point will announce its own maximum transmit power for the subchannel. Based on that announcement, individual stations will decide if they should listen for transmissions on that subchannel. In one variant, each station can check the subchannel's announced power level and decide whether the station should attempt to access the subchannel to receive downlinks. In another variant, stations can be assigned to groups, and each station can compare the subchannel's announced power level to the station's assigned group power level to decide whether the station should attempt to access the subchannel to receive downlinks.

In a frequency-division power control implementation, each subchannel can have its own CCA level. For example, if a subchannel is intended for stations with good signal qualities that use low power, the CCA level can be reduced (i.e., made less sensitive) for that subchannel.

Figure 7:
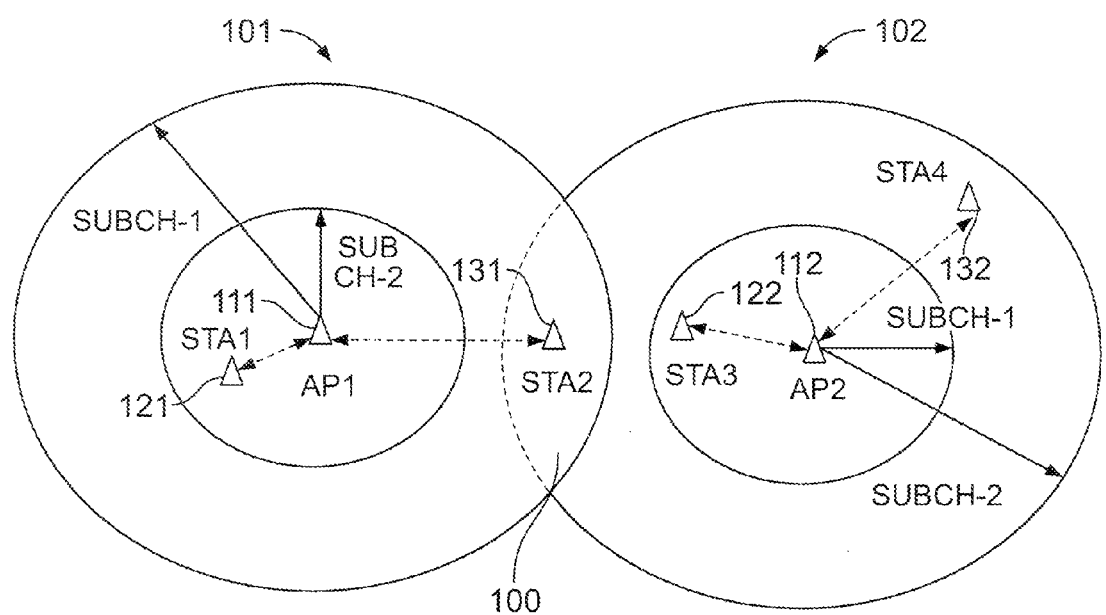
FIG. 7 shows a frequency-division power control implementation of an OBSS arrangement similar to that of FIG. 1.

Frequency-division power control provides a convenient way to manage interference between neighboring BSSs in an OBSS setting. FIG. 7 shows a frequency-division power control implementation of an OBSS arrangement similar to that of FIG. 1. Once again, BSS 101, served by access point AP1 (111), overlaps with BSS 102, served by access point AP2 (112). BSS 101 also includes stations STA1 (121) and STA2 (131), while BSS 102 also includes stations STA3 (122) and STA4 (132); station STA2 (131) is in the overlap area 100.

By assigning transmit power levels and CCA settings at the subchannel level, frequency-division power control defines effective cell size of a wireless local-area network at the subchannel level. In other words, different subchannels of the same channel can have different effective cell sizes. Therefore, in the arrangement of FIG. 7, the neighboring access points AP1 (111) and AP2 (112) can coordinate their frequency-division power control settings, with one access point setting a particular subchannel to a high power level while the other access point sets that subchannel to a low power level. Specifically, in the example shown, access point AP1 (111) sets subchannel-1 to a higher power level (for communicating with "edge" stations such as STA2 (131)), while access point AP2 (112) sets subchannel-1 to a lower power level (for communicating with "center" stations such as STA3 (122)). At the same time, access point AP1 (111) sets subchannel-2 to a lower power level (for communicating with "center" stations such as STA1 (121)), while access point AP2 (112) sets subchannel-2 to a higher power level (for communicating with "edge" stations such as STA4 (132)). According to this example, even though STA2 (131) is in overlap area 100, STA2 (131) and access point AP2 (112) do not interfere because STA2 (131) is operating on a subchannel that access point AP2 (112) is using for "center" stations. As above, STA2 (131) and STA3 (122) do not interfere even though they are near each other and both operating on subchannel-1, because they are operating at different power levels.

Figure 8:
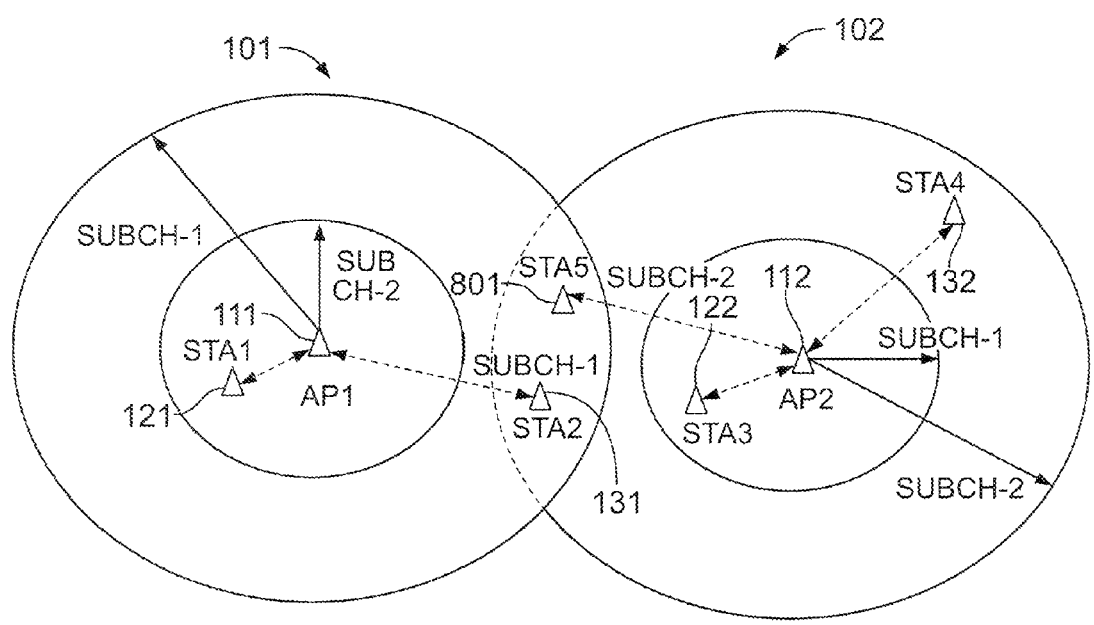
FIG. 8 shows an OBSS configuration similar to that of FIGS. 1 and 7, with an additional station located in overlap area.

FIG. 8 shows an OBSS configuration similar to that of FIGS. 1 and 7, except that an additional station, STA5 (801), in BSS 102 is located in overlap area 100 with STA2 (131) of BSS 101. Even though both STA2 (131) and STA5 (801) are in the edge areas of their respective BSSs, they do not interfere because access point AP1 (111) is using subchannel-1 for "edge" stations while access point AP2 (112) is using subchannel-1 for "edge" stations, meaning STA2 (131) and STA5 (801) are operating on different subchannels.

Figure 9:
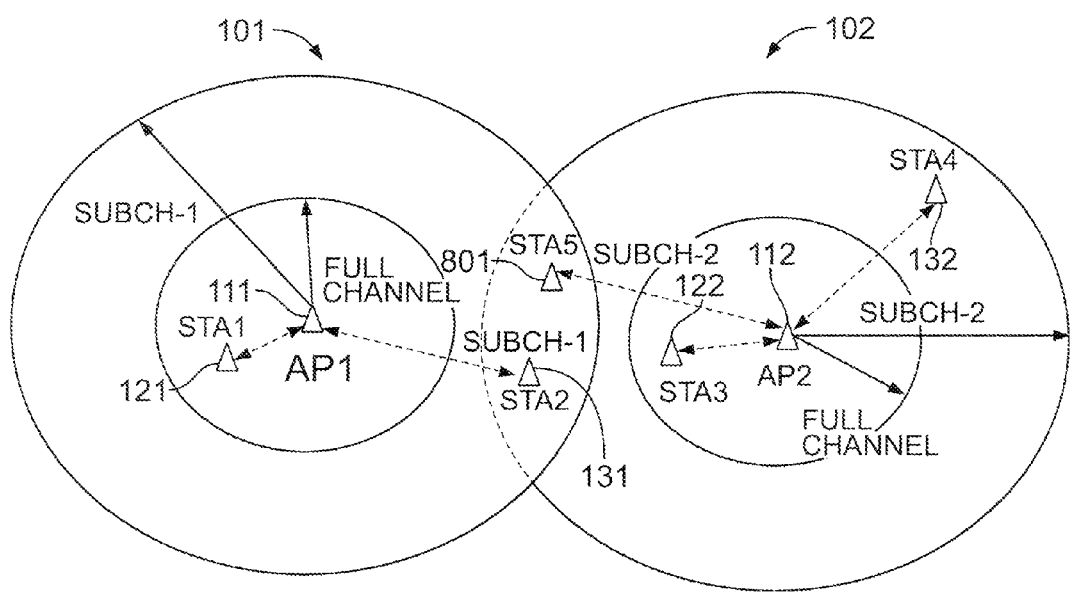
FIG. 9 shows an OBSS configuration as in FIG. 8, except that each access point uses the full channel, rather than only one subchannel, in the center area.

FIG. 9 shows the same OBSS configuration as in FIG. 8, except that each access point AP1 (111) and AP2 (112) uses the full channel, rather than only one subchannel, in its respective center area. This does not involve any difference in subchannel power levels. Access point AP1 (111) still sets subchannel-1 to a higher power level and sets subchannel-2 to a lower power level, while access point AP2 (112) still sets subchannel-1 to a lower power level and sets subchannel-2 to a higher power level. What is different is the allocation or assignment of stations. Here, while the lower-power subchannels (subchannel-2 for BSS 101 and subchannel-1 for BSS 102) are for communication only with "center" stations of the respective BSSs (e.g., STA1 (121) and STA3 (132)), the higher-power subchannels (subchannel-1 for BSS 101 and subchannel-2 for BSS 102) are for communicating not only with "edge" stations such as STA2 (131), STA4 (132) and STA5 (801) but also with "center" stations such as STA1 (121) and STA3 (132). This could be accomplished by having "center" stations that do not need a higher-power subchannel nevertheless attempt to access the higher-power subchannels (if there is available capacity on the subchannel, the attempt will succeed) in addition to attempting to access the lower-power subchannels. This can improve spectrum reuse if there is not enough "edge" traffic to utilize the full capacity of the higher-power subchannels.

Frequency-division power control for neighboring access points can be controlled by a central authority that plans and allocates the frequencies among various BSSs, or each access point can use knowledge of its immediate neighbor BSSs to adjust its own settings. Existing mechanisms for determining the state of a neighboring BSS can be used, or new mechanisms specifically designed for frequency-division power control can be provided.

Frequency-division power control as disclosed herein can be used with WLAN systems that support channel aggregation, multichannel operation, and Orthogonal Frequency-Division Multiple Access (OFDMA). Such systems support channel aggregation with continuous channels (e.g., one 20 MHz-wide primary channel and one or multiple 20 MHz-wide secondary channels), channel aggregation with discontinuous channels (e.g., 80+80 MHz as in IEEE802.11ac systems), and subchannelization in OFDMA-type channel access with various sizes of subchannels (e.g., 2.5 MHz-wide, 5 MHz-wide, 10 MHz-wide or 20 Mhz-wide subchannels). For the WLAN systems that support sectorization, frequency-division power control as disclosed herein can be applied to sectors and subchannels (e.g., in a BSS, different sectors can use different subchannels with different frequency-division power control settings such as transmit power settings and CCA sensitivity settings). Also, different sectors may have different coordination plans with different neighbor BSSs.

In other implementations, time-division power control and frequency-division power control can be combined. For example, an access point can announce a series of time-domain power windows, where, in each window, the sub-channelization scheme is different. Alternatively, in a frequency-division system, each channel can have multiple subchannelization schemes, and the access point can announce a power window to select one of the schemes. And in a fully "two-dimensional" system, the access point can announce a time-division window and a frequency-division subchannel scheme simultaneously.

Figure 10:
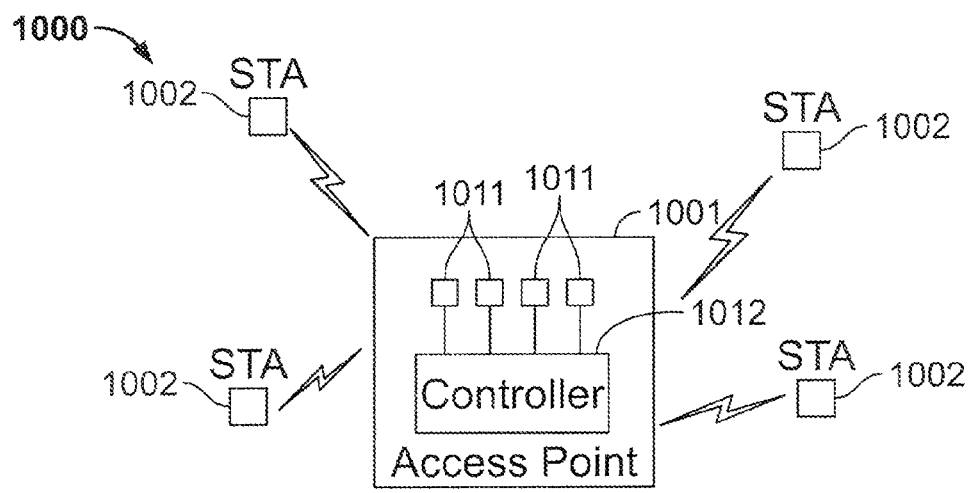
FIG. 10 shows a block diagram of an exemplary system according to an implementation of this disclosure.
Figure 11:
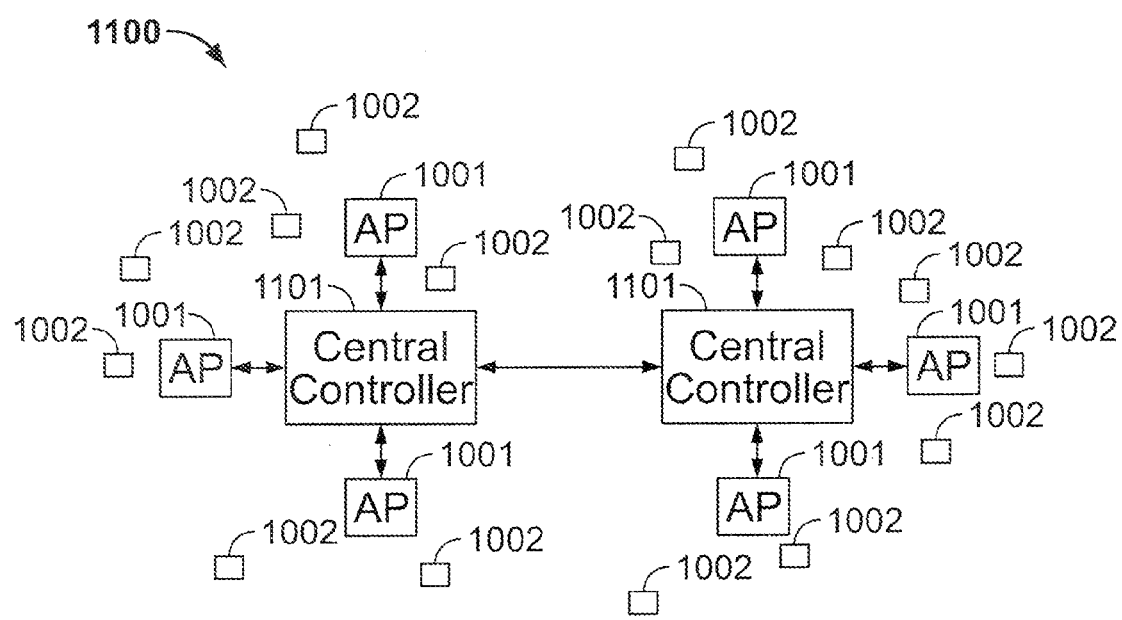
FIG. 11 shows a block diagram of another exemplary system according to an implementation of this disclosure.

FIG. 10 shows a block diagram of an exemplary system 1000 including stations 1002 and an exemplary access point 1001, having a plurality of transceivers 1011 for operating a plurality of channels and subchannels, and a controller 1012 which, among other things, selects the power scheme and channelization/subchannelization schemes. A plurality of access points 1001 may be part of a larger system 1100 controlled by one or more central controllers 1101 as shown in FIG. 11.

Figure 12:
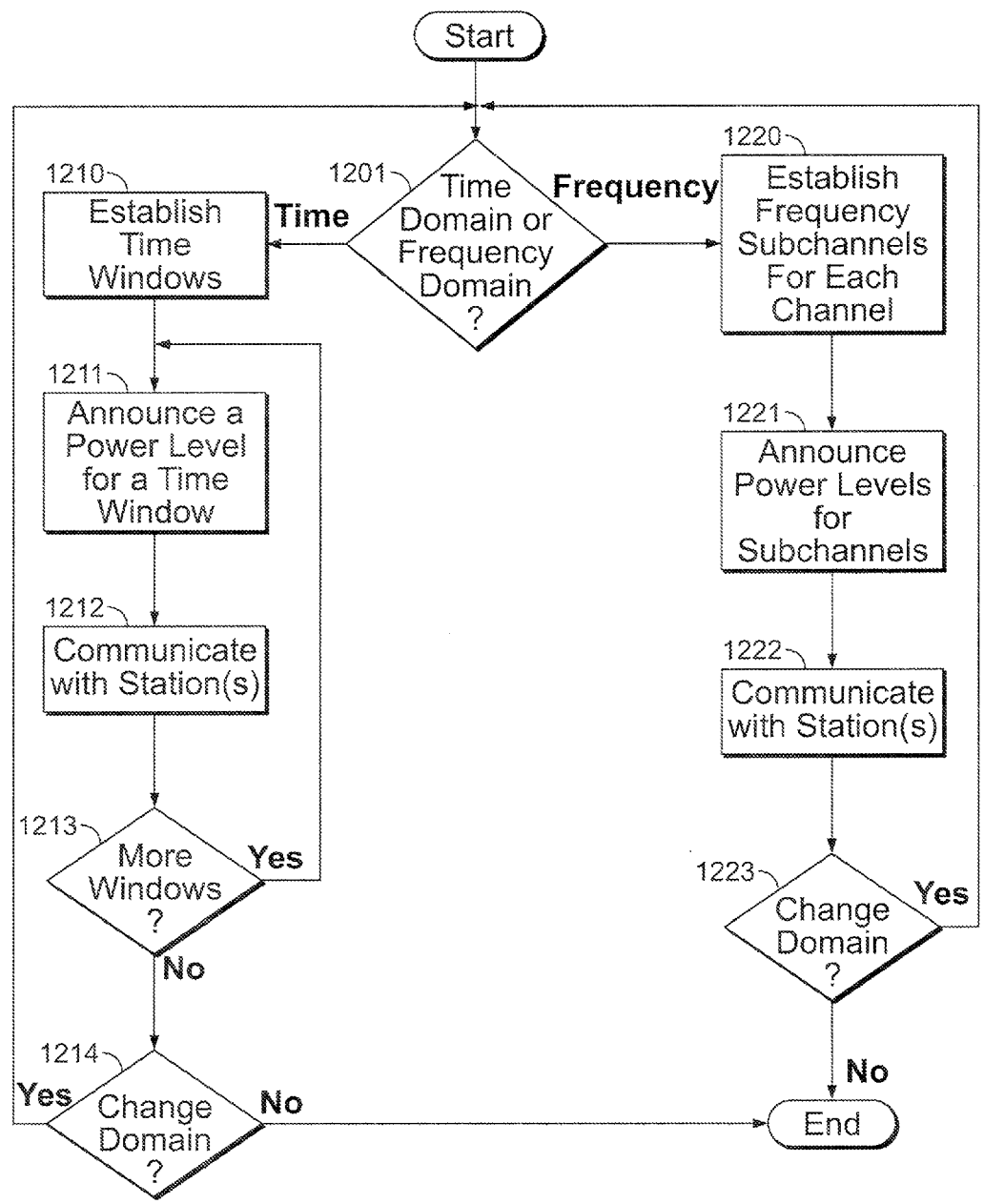
FIG. 12 is a flow diagram of a basic method 1200 according to implementations of this disclosure for operation of an access point.

A basic exemplary method 1200 according to implementations of this disclosure for operation of an access point is diagrammed in FIG. 12.

At 1201, it is decided (by the access point or a central controller, e.g. based on user input) whether to operate in the time domain or the frequency domain.

If operation is in the time domain, then at 1210, time windows are established by the access point. At 1211, the access point announces a power level for an upcoming time window. The power level could be set, as described above, by the access point itself based on inspection of power levels of neighbor access points, based on consultation with neighbor access points, or under control of a central controller.

At 1212, the access point communicates with stations during the time window. As noted above, the stations could be individually assigned to the power level associated with the window, or could be part of a group. After the time window closes, at 1213 it is determined whether an additional time window is to be set. If so, the new window is set at 1212. If at 1213 no new windows are to be set, then at 1214 it is determined whether the operating mode should be changed. If so, the new mode is selected at 1201. If at 1214 the operating mode is not to be changed, then method 1200 ends.

If at 1201 operation is in the frequency domain, then at 1220, frequency subchannels are established for each channel by the access point. At 1221, the access point announces a power level for each subchannel. The power level could be set, as described above, by the access point itself based on inspection of power levels of neighbor access points, based on consultation with neighbor access points, or under control of a central controller.

At 1222, the access point communicates with stations on the various subchannels. As noted above, the stations could be individually assigned to the power level associated with a subchannel, or could be part of a group. After there are no more communications, at 1223 it is determined whether the operating mode should be changed. If so, the new mode is selected at 1201. If at 1223 the operating mode is not to be changed, then method 1200 ends.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A wireless communication system comprising:
   a first wireless access point; and
   a first set of first stations in wireless communication with the first wireless access point;
   wherein the first set of first stations is divided into groups, each group including at least one of the first stations;
   wherein each group of first stations is assigned to a respective one of a plurality of power levels;
   wherein the first wireless access point controls power for communications with at least one of the groups of first stations by announcing a power level on a channel;
   wherein a station in the at least one of the groups of first stations accesses the channel when the announced power level is a respective one of the plurality of power levels to which the at least one group of first stations is assigned; and
   wherein the first wireless access point implicitly assigns first stations within the first set of at least one first station to respective ones of the plurality of power levels by announcing the plurality of power levels, allowing a respective one of the first stations to select a respective one of the plurality of power levels according to power needs of the respective one of the first stations.

2. The wireless communication system of claim 1, wherein the first wireless access point explicitly assigns at least one of the first stations within the first set of at least one first station to one of the plurality of power levels.

3. The wireless communication system of claim 1, wherein the first wireless access point controls power for uplink communications.

4. The wireless communication system of claim 1, wherein the first wireless access point controls power for downlink communications.

5. The wireless communication system of claim 1, wherein the first wireless access point controls power in a time-domain, wherein the announcing of a power level on a channel comprises announcing a time window during which the power level is to be used.

6. The wireless communication system of claim 5, further comprising:
   an additional wireless access point; and
   an additional set of at least one additional station in wireless communication with the additional wireless access point,
   wherein the additional wireless access point controls power for communications with an additional station in the additional set of at least one additional station, and wherein the first wireless access point and the additional wireless access point control power to avoid interference between the first wireless access point and the additional wireless access point.

7. The wireless communication system of claim 6, wherein:
the first wireless access point sets a high power level when the additional wireless access point sets a low power level; and
the first wireless access point sets a low power level when the additional wireless access point sets a high power level.

8. The wireless communication system of claim 1, wherein the first wireless access point controls power levels in a frequency-domain, wherein the announcing of a power level on a channel comprises announcing different power levels for different frequency subchannels within a frequency channel.

9. The wireless communication system of claim 8, further comprising:
an additional wireless access point; and
an additional set of at least one additional station in wireless communication with the additional wireless access point,
wherein the additional wireless access point controls power for communications with an additional station in the additional set of at least one additional station, and
wherein the first wireless access point and the additional wireless access point control power to avoid interference between the first wireless access point and the additional wireless access point.

10. The wireless communication system of claim 9, wherein:
the first wireless access point sets a high power level for a first subchannel and a low power level for a second subchannel when the additional wireless access point sets a low power level for the first subchannel and a high power level for the second subchannel.

11. The wireless communication system of claim 1, further comprising:
an additional wireless access point; and
an additional set of at least one additional station in wireless communication with the additional wireless access point; and
a central controller that coordinates between the first wireless access point and the additional wireless access point so that the first wireless access point and the additional wireless access point set power levels to avoid interference between the first wireless access point and the additional wireless access point.

12. A method of operating a wireless communication system having a first wireless access point, and a first set of first stations in wireless communication with the first wireless access point, wherein the first set of first stations is divided into groups, each group including at least one of the first stations, the method comprising:
assigning each group of first stations to a respective one of a plurality of power levels; and
controlling power at the first wireless access point for communications with at least one of the groups of first stations by announcing a power level on a channel;
wherein a station in the at least one of the groups of first stations accesses the channel when the announced power level is a respective one of the plurality of power levels to which the at least one group of first stations is assigned; and
wherein the assigning comprises implicitly assigning, by the first wireless access point, of first stations within the first set of at least one first station to respective ones of the plurality of power levels by announcing the plurality of power levels, allowing a respective one of the first stations to select a respective one of the plurality of power levels according to power needs of the respective one of the first stations.

13. The method of claim 12, wherein the assigning further comprises explicitly assigning, by the first wireless access point, at least one of the first stations within the first set of at least one first station to one of the plurality of power levels.

14. The method of claim 12, wherein the controlling comprises controlling power at the first wireless access point for uplink communications.

15. The method of claim 12, wherein the controlling comprises controlling power at the first wireless access point for downlink communications.

16. The method of claim 12, wherein the controlling comprises controlling power at the first wireless access point in a time-domain, wherein the announcing of a power level on a channel comprises the first wireless access point announcing a time window during which the power level is to be used.

17. The method of claim 16, wherein the wireless communication system further includes an additional wireless access point, and an additional set of at least one additional station in wireless communication with the additional wireless access point; the method further comprising:
controlling power at the additional wireless access point for communications with an additional station in the additional set of at least one additional station; wherein:
the first wireless access point and the additional wireless access point control power levels to avoid interference between the first wireless access point and the additional wireless access point.

18. The method of claim 17, wherein controlling power at the first wireless access point comprises:
setting a high power level when the additional wireless access point sets a low power level; and
setting a low power level when the additional wireless access point sets a high power level.

19. The method of claim 17, wherein controlling power at the additional wireless access point comprises:
setting a high power level when the first wireless access point sets a low power level; and
setting a low power level when the first wireless access point sets a high power level.

20. The method of claim 12, wherein the controlling comprises controlling power at the first wireless access point in a frequency-domain, wherein the announcing of a power level on a channel comprises the first wireless access point announcing different power levels for different frequency subchannels within a frequency channel.

21. The method of claim 20, wherein the wireless communication system further includes an additional wireless access point, and an additional set of at least one additional station in wireless communication with the additional wireless access point; the method further comprising:
controlling power at the additional wireless access point for communications with an additional station in the additional set of at least one additional station; wherein:
the first wireless access point and the additional wireless access point control power levels to avoid interference between the first wireless access point and the additional wireless access point.

22. The method of claim 21, wherein controlling power at the first wireless access point comprises setting, at the first wireless access point, a high power level for a first subchannel and a low power level for a second subchannel when the additional wireless access point sets a low power level for the first subchannel and a high power level for the second subchannel.

23. The method of claim 21, wherein controlling power at the additional wireless access point comprises setting, at the additional wireless access point, a high power level for a first subchannel and a low power level for a second subchannel when the first wireless access point sets a low power level for the first subchannel and a high power level for the second subchannel.

24. The method of claim 12, wherein the wireless communication system further includes an additional wireless access point, and an additional set of at least one additional station in wireless communication with the additional wireless access point; the method further comprising:
    coordinating between the first wireless access point and the additional wireless access point so that the first wireless access point and the additional wireless access point set power levels to avoid interference between the first wireless access point and the additional wireless access point.

* * * * *